Dec. 26, 1967 P. BRET 3,360,168
FLUID-DISPENSING SYSTEMS
Filed Dec. 1, 1965 2 Sheets-Sheet 2

United States Patent Office 3,360,168
Patented Dec. 26, 1967

3,360,168
FLUID-DISPENSING SYSTEMS
Pierre Bret, 27 Ave. Saint-Exupery, Meudon-la-Foret,
(Seine-et-Oise), France
Filed Dec. 1, 1965, Ser. No. 510,774
Claims priority, application France, Jan. 8, 1965,
1,238
17 Claims. (Cl. 222—335)

ABSTRACT OF THE DISCLOSURE

A fluid-dispensing system for dispensing accurately measured amounts of fluid. The apparatus is contained in a stopper for a vessel containing the fluid. The stopper comprises a three-position distributor head which, in various positions enables filling and pressurizing the bottle; measuring of a predetermined dose; and dispensing the dose. The stopper is provided with a chamber of the desired volume and a resilient diaphragm within the chamber and acted upon by the pressurized fluid when the distributor is in its measuring position. The diaphragm stretches to the shape and volume of the chamber and is filled with the fluid. When the distributor is in its dispensing position, the chamber is emptied of the fluid.

---

The present invention has for its object dispensing systems such as those used for dispensing a liquid or syrupy medicine in repeated accurately measured doses. Known arrangements generally make use of a so-called measuring valve fitted over the neck of a container or bottle containing the medicine, the medicine being forced out of the valve by an inert compressed gas associated with the contents of the bottle.

Such prior arrangements have various disadvantages and, in particular, they lack faithfulness in that the measurement is never provided accurately and the errors are sometimes as great as 15%. The container is never completely emptied of its contents and the pressure exerted by the propelling gas is often very high. Furthermore, the dispensing speed is almost always governed by the pressure of the propelling gas, which pressure is too large at the beginning and too low at the end of the useful life of the container.

This invention has for its object an improved arrangement eliminating the above-mentioned disadvantages and it achieves the desired result in accordance with a main feature of the invention consisting in the measurement of the dose of medicine in two stages: during a first stage, the medicine is expelled from the main container and fills an auxiliary chamber the volume of which is selected so as to be equal to the measured amount to be dispensed, while the medicine is discharged from the auxiliary chamber during a second stage under a constant pressure, so as to supply the desired dose to the user. It is readily apparent that this invention ensures a constant and accurate volume for the dose to be dispensed. It also insures that the dispensing speed of the medicine is independent of the pressure of the propelling gas within the main container holding the medicine.

A further object of this invention is to provide a means for emptying substantially completely the bottle or like container carrying the medicine.

According to yet another object of this invention the pressure of the propelling gas in the main container is lowered to a greater extent by reducing to a maximum extent the head losses.

A still further object of this invention consists in producing an arrangement which may, after being subjected to all the requirements of pharmaceutical packagings, be filled in vacuo with the liquid medicine and with the propelling fluid under well-defined conditions.

A last object of the invention consists in producing a container adapted to be stored for a very long time without any loss of the propelling gas or of the medicine.

Figure 1:
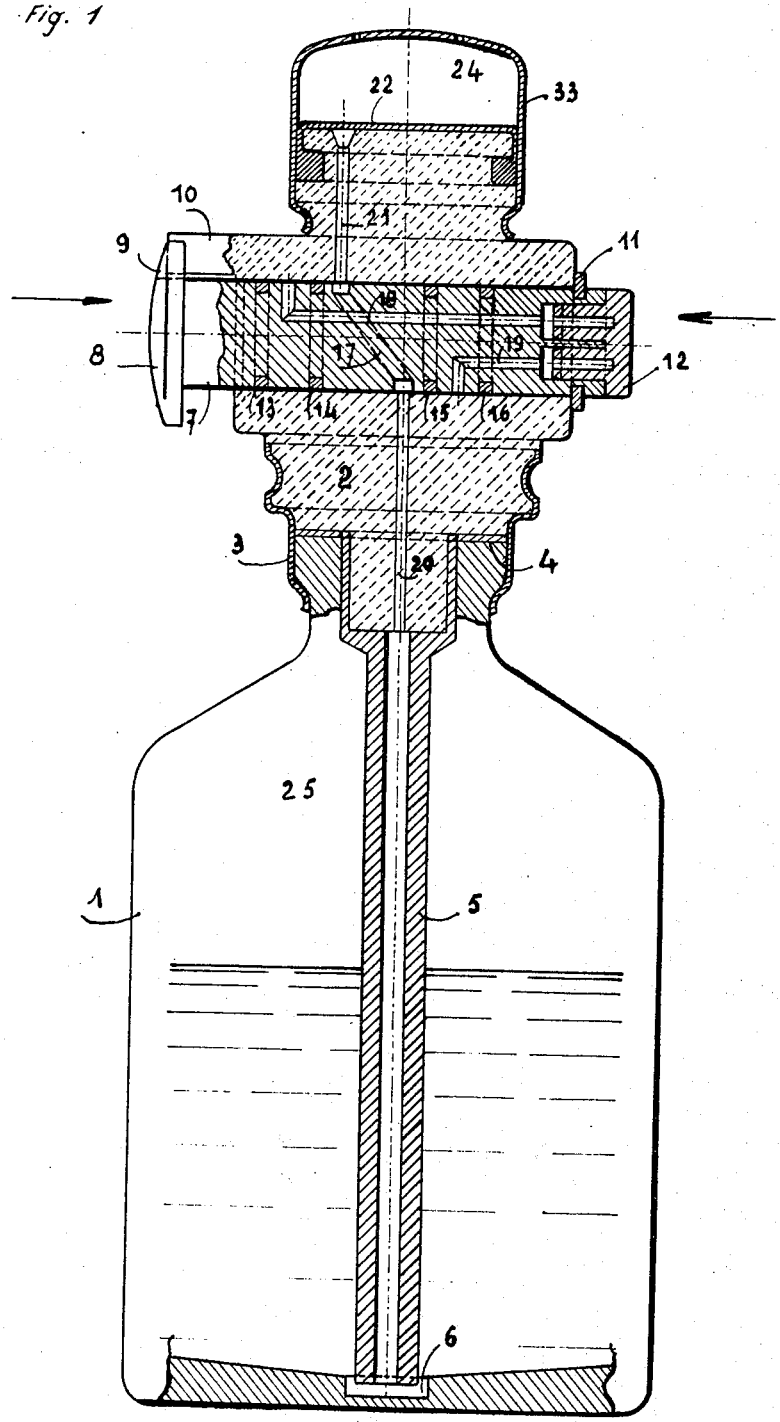
Figure 2:
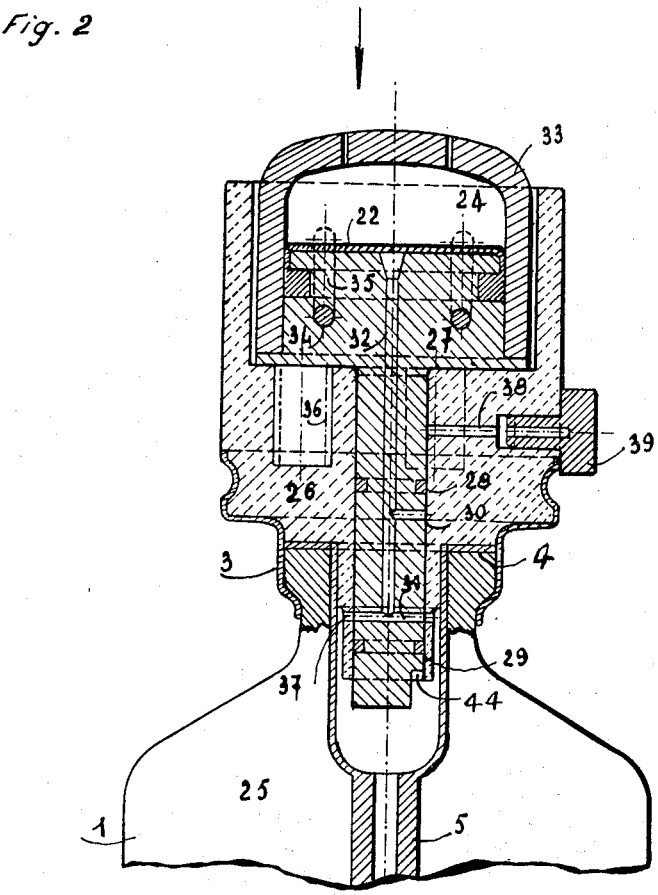

The invention will be readily understood from the following description of various embodiments thereof given by way of example and by no means in a limiting sense, said embodiments being illustrated in the accompanying drawings wherein FIGS. 1 and 2 are vertical cross-sections of two embodiments of a bottle provided with a dispensing arrangement according to the invention, the actual bottle being only partly shown in FIG. 2.

Figure 3:
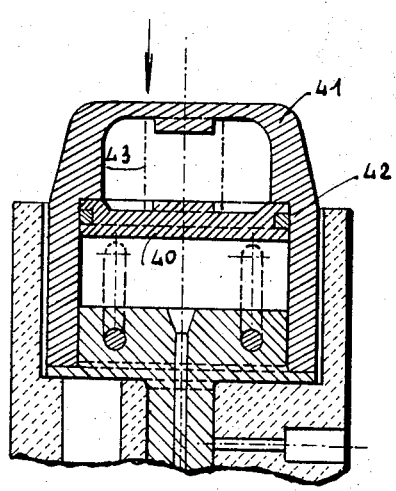

FIG. 3 is a partial vertical cross-section of a modification of FIG. 2 wherein the volume of the dose is defined by the stroke of a piston instead of being defined by the limited deformation of a diaphragm.

In the different embodiments described, the members playing the same parts are designated by the same reference numbers.

As illustrated in FIG. 1, the bottle carrying the desired amount of medicine is closed by a stopper 2 which is held in position on the bottle, in the embodiment described and illustrated, by a crimped ring 3, while a flat packing 4 is inserted between the stopper and the bearing surface provided therefore on the upper edge of the neck of the bottle. Over the lower projecting end of the stopper, there is fitted a rigid tube 5 dipping into a small cup-shaped depression 6 provided at the bottom of the bottle. The depression permits the substantially complete emptying of the bottle under the action of the pressure of the propelling gas, the only amount of medicine remaining in the bottle being that collecting at the bottom of the depression, the cross-section of which is very small with reference to the total cross-section of the bottle.

Through stopper 2 there extends transversely a distributor 7 controlled by a knob 8, provided with a groove 9, engaging a guiding tongue 10, rigid with the stopper 2. Said tongue and groove system allows only axial movement of the distributor. Said axial movement of the distributor 7 towards the right-hand side is limited by the surface of the knob 8 engaging the stopper and its movement towards the left-hand side is limited by a removable braking member or stop 11 also engaging the stopper. A plug 12 closes the ports provided at the right-hand end of said distributor which is provided with four annular grooves in which are fitted fluidtight tore-shaped packings 13, 14, 15 and 16. Furthermore, said distributor is provided between rings 14 and 15 with a peripheral groove 17 extending obliquely as shown at 17. A square-shaped channel 18 formed in the distributor connects the portion of its outer periphery extending between rings 13 and 14 with a port formed in the right-hand end of the distributor while a second square-shaped channel 19 also formed in the distributor connects the portion of its outer periphery extending between packing rings 15 and 16 with a further port formed in the right-hand end of the distributor. The removable plug 12 covers the output ports of said channels at the right-hand end of the distributor. The lower part of stopper 2 is provided with a vertical channel 20 extending through it in alignment with the channel formed by dipper tube 5. The upper section of the stopper 2 is provided with a further vertical channel 21 extending between the location of the distributor and a resilient diaphragm 22 fitted with a preliminary tensioning over the upper end of the stopper 2. A bell-shaped measuring member 23 which limits the deformation of diaphragm 22 caps the upper end of the stopper carrying the diaphragm, said bell-shaped member providing a free space 24 between it and the diaphragm which defines thus the possible elastic deformation of diaphragm 22. The maximum volume of the chamber under the bell-shaped member 23 encloses the dose of medicine which is dispensed at each operation.

In the embodiment illustrated in FIG. 1, the propelling gas occupies the volume 25 extending above the level of the liquid medicine in container 1. The pressure of the gas urges the medicine towards the underside of the measuring diaphragm 22 through the channel defined by the dipper tube 5 and the channels 20, 17 and 21 which communicate together for the position of the distributor illustrated in FIG. 1. The diaphragm 22 expands then within the free space 24 afforded by the measuring cap 23 fitted over the stopper 2. A well-defined volume of liquid medicine corresponding to the desired dose thus fills the space 24, the fluidtight packings 14 and 15 ensuring fluidtightness during the transfer from the bottle to chamber or space 24. In order to provide the ejection of said dose for use, plug 12 is removed and the distributor is shifted towards the right-hand side of FIG. 1, whereupon knob 8 abuts against the stopper 2, so that the square-shaped channel 18 is positioned in communication with the channel 21 while the connection with the bottle through the channel 17 is cut off. The diaphragm 22 then resumes its original shape and by collapsing urges the liquid outwardly through the cooperating channels 21 and 18. During said ejection, there is no leak along these channels 18 and 21 which are isolated by the fluidtight packings 13 and 14 and furthermore there is no possible leak through the channel 20 which is isolated in a similar manner by the fluidtight packings 14 and 15.

The speed of ejection of the medicine out of the chamber 24 is determined by the pressure exerted by the elastic diaphragm 22, the elasticity of which is independent of both the pressure of the propelling gas inside the container 1 and the volume of medicine remaining at any moment within the container.

Obviously, the bottle may be emptied completely, except for the residual idle space constituted by the total volume formed by the tube 5 and the channels 20, 17 and 21, and said idle space to which must be added the volume of the cup-shaped depression 6 forming only a very small fraction of the bottle volume is selected in all cases as equal to less than 1% of said bottle volume in the case of bottles of a conventional capacity. It is also obvious that errors in the measurement of the dose, ascribable to modifications in the volume 24 bounded by the measuring cap 23, may also be brought to a figure lower than 1%.

The embodiment illustrated in FIG. 1, when empty before its filling with medicine, is first subjected to all the conventional pharmaceutical packaging operations such as cleaning, sterilizing, etc., after which it is filled with liquid medicine and with an inert propelling gas. To this end, it is sufficient to remove the plug 12 and the braking member 11 and to shift the distributor 7 towards the left-hand side of FIG. 1 until the square-shaped channel 19 communicates with the vertical channel 20. A fluidtight nozzle is then fitted over the port at the outer end of the channel 19, so that it is possible by resorting to an arrangement which need not be described to produce vacuum inside the container 1, after which the latter is filled with the desired amount of liquid medicine and, lastly, the propelling gas in introduced under the desired pressure. The bottle being thus loaded, it is sufficient to shift the distributor 7 towards the right-hand side until knob 8 abuts against the stopper beyond the position illustrated in FIG. 1. The braking stop 11 is then reinserted. The channel 21 and the channel 18 are thus in registry and communicate with the outer atmosphere, while the channel 17 is isolated so as to cut off the inside of the bottle. The distributor being then outwardly closed by the plug 12, the whole system is protected against all outer influence.

The embodiment shown in FIG. 2 is a modification of that illustrated in FIG. 1 with the difference consisting in that the distributor is positioned vertically, while any other oblique arrangement of the distributor is also obviously possible. The vertical distributor 27 is shifted axially inside the stopper 26 closing the bottle 1. The periphery of said distributor carries two tore-shaped fluidtight packings such as 28 and 29 and between said two packings two radial channels 30 and 31 connect the outer periphery of the stopper with an axial channel 32 leading to the underside of the measuring diaphragm 22. Said diaphragm which is similar to that illustrated in FIG. 1 caps and is crimped over the upper end of the distributor 27; a bell-shaped member 33 is provided above the diaphragm, so as to enclose a chamber 24 similar to that illustrated at 24 in FIG. 1. Said bell-shaped measuring member 33 and the distributor 27 are rigidly interconnected by two pins 34 passing through them, while the projecting ends of said pins or the like parts are adapted to slide in vertically elongated slots 35 provided in the upper annular flange formed on the stopper 26.

Two or more compression springs 36 are associated with the distributor to urge the latter upwardly. The stopper 26 is furthermore provided with two parts 37 and with an ejecting channel 38 of which the opening into the outer atmosphere is closed by a plug 39.

In this modified arrangement, the operation is the same as in the case of FIG. 1 when the bottle is suitably loaded and the propelling gas fills the chamber 25 inside the bottle. In order to obtain a dose, the operator depresses the system including the distributor 27 and the bell-shaped measuring member 33, so as to hold it in its lower position as illustrated by a downwardly exerted pressure opposing the action of the different springs 36. The propelling gas drives then the liquid medicine upwardly, through the ports 37 in the stopper and the channels 31 and 32 in the distributor registering with said parts so as to fill the chamber formed underneath the measuring diaphragm within the limits defined by the free volume or chamber 24 enclosed by the bell-shaped measuring member 33. The fluidtight packing 28 then prevents the medicine from leaking outwardly. When the operator ceases depressing the system including the distributor and the measuring member, the springs 36 urge said system upwardly until the projecting ends of the pins 34 abut against the upper ends of the slots 35. The radial channel 30 in the distributor is then located in alignment with the ejecting channel 38 in the stopper. The plug 39 being previously removed, the liquid medicine is urged outwardly by the diaphragm 22 which returns elastically into its original position. No leak is possible for the position then assumed by the diaphragm since the fluidtight packings 28 and 29 are positioned above the corresponding channels 38 and 26. Obviously, the advantages of said arrangement are the same as those of the arrangement according to FIG. 1 except for the fact that the dose is ejected when the pressure exerted on the system including the distributor and the measuring bell-shaped member is released.

In order to fill the arrangement according to FIG. 2 with medicine and gas, after a preliminary vacuum has been obtained, it is sufficient to remove the pins 34 to allow the system including the distributor and bell-shaped member to rise under the action of the springs 36 above the position illustrated, said system being then held fast in a position corresponding to a registering of slot 44 with the ejection channel 38. In this position, fluid-tight packing 29 is positioned above ejection channel 38. It is then possible to proceed with the complete loading in the same manner as in the case described with reference to FIG. 1. When the loading of the bottle is at an end, the pins 34 are reinserted, care being taken that said pins abut against the upper end of the grooves or slots 35 formed in the upper flange of the plug 26. It is then possible to close the ejection channel 39 by means of the plug 38.

The arrangement illustrated in FIG. 3 is similar to that illustrated in FIG. 2, except for the elimination of the diaphragm which is replaced by a piston 40 held in a fluidtight condition by a fluidtight packing 42, while a spring 43 engaging the measuring bell-shaped members of cap 41 produces, through its expansion, the ejection of the measured medicine dose outwardly.

Obviously, the arrangements described hereinabove show the advantages already referred to and furthermore many detail modifications in shape or the like may be brought to said arrangement, my invention being by no means limited to the particular embodiments and applications referred to and covering all the modifications thereof, considered singly or in combination and falling within the scope of the accompanying claims.

What I claim is:

1. A fluid-dispensing system comprising, in combination with a container, a stopper for sealing the container and having upper and lower ends, a hollow cap fitted on the upper end of the stopper and defining therewith a space of predetermined volume, a resilient diaphragm fitted on the upper end of the stopper and adapted to move between a collapsed position and a stretched position, in which latter position said diaphragm conforms to the shape of the cap and defines a chamber with the upper end of the stopper having a volume which corresponds to that of said space, a dipper tube on the lower end of the stopper extending into the container, said stopper having two vertically disposed channels for the flow of fluid therethrough and an elongated perforation in communication with said channels, a distributor having three channels and movable slidably within the elongated perforation, said distributor being adapted to selectively occupy three positions, in a first of which a first channel in the distributor communicates with a first vertical channel in the stopper and with the dipper tube whereby the container can be filled with fluid and a propelling gas to pressurize the container, said first vertical channel being in communication with a second channel in the distributor and with a second vertical channel in the stopper in a second position of the stopper whereby fluid from the container urges the diaphragm to its stretched position and fills the chamber with the predetermined volume of fluid, said chamber being in communication with said second vertical channel in the stopper and with a third channel in the distributor in a third position of the distributor whereby the predetermined volume of fluid is dispensed from the chamber.

2. A fluid-dispensing system as claimed in claim 1, wherein the container has a bottom part provided with a depression and the dipper tube extends into said depression to facilitate substantially complete emptying of the container.

3. A fluid-dispensing system as claimed in claim 1, comprising means surrounding the distributor for insuring leak-proof flow of fluid through the channels in said distributor.

4. A fluid-dispensing system as claimed in claim 3, wherein the means surrounding the distributor is fluidtight packings.

5. A fluid-dispensing system as claimed in claim 4, wherein the distributor is substantially cylindrical in shape and the fluidtight packings are toroidal in shape.

6. A fluid-dispensing system as claimed in claim 1, wherein the distributor has an end at which the first and third channels of the distributor open and comprising a plug in removable engagement with said end to close said first and third channels.

7. A fluid-dispensing system as claimed in claim 6 comprising means engaging the end of the distributor and the plug for limiting the sliding movement of the distributor to the second and third positions.

8. A fluid-dispensing system as claimed in claim 7, wherein the means for limiting the sliding movement of the distributor is a removable braking member, which when removed permits the distributor to be moved into its first position.

9. A fluid-dispensing system as claimed in claim 1, wherein the upper end of the stopper is provided with at least two depressions, the resilient diaphragm comprising a heel portion engaged in a first of said depressions, the cap being engaged in the other of said depressions and securing the heel of the diaphragm in said first depression.

10. A fluid-dispensing system for a container, said fluid dispensing system comprising a stopper member for the container, a hollow cap member on the stopper member defining therewith a chamber of fixed extent and predetermined volume, a resilient diaphragm secured to one of said members and freely movable between a relaxed position on the stopper member and a stretched position in conformity with the cap member, distributor means mounted for slidable movement in the stopper member and having three positions in which pressure fluid can be respectively supplied to the container; supplied beneath the diaphragm to displace same into the stretched position and charge a volume of pressure fluid equal to that of said chamber between the stretched diaphragm and the stopper member; and discharged externally of the container.

11. A fluid-dispensing system as claimed in claim 10 comprising means surrounding the distributor means for insuring leak-proof flow of fluid for any of the three positions of the distributor means.

12. A fluid-dispensing system as claimed in claim 11, wherein the means surrounding the distributor means is fluidtight packings.

13. A fluid-dispensing system as claimed in claim 12, wherein the distributor means is substantially cylindrical in shape and the fluidtight packings are toroidal in shape.

14. A fluid-dispensing system as claimed in claim 10, wherein the stopper member comprises means for supplying pressure fluid to the container and discharging pressure fluid from the container and has a surface having a cut-out region in which the means for supplying and discharging opens externally of the stopper member and comprising a plug in removable engagement with said cut-out region to close said means for supplying and discharging.

15. A fluid-dispensing system as claimed in claim 10, wherein the stopper member comprises removable means for limiting the sliding movement of the distributor means to the positions in which pressure fluid can be supplied beneath the diaphragm and in which pressure fluid can be discharged.

16. A fluid-dispensing system as claimed in claim 15, wherein the removable means for limiting the sliding movement is pin means mounted in and securing together the stopper member, the hollow cap member and the distributor means, which removable means when removed permits the distributor means to be moved into its position for supplying pressure fluid to the container.

17. A fluid-dispensing system as claimed in claim 10 comprising spring means within the stopper member, said spring means being compressed by the distributor means when the distributor means is in the position for supplying pressure fluid beneath the diaphragm and being expandible to urge the distributor means into the position for discharging pressure fluid externally of the container.

References Cited

UNITED STATES PATENTS

| | | | |
|---|---|---|---|
| 2,305,286 | 12/1942 | Ward | 222—402.16 X |
| 3,126,132 | 3/1964 | Lyon et al. | 222—402.16 X |
| 3,138,301 | 5/1964 | Ward | 222—335 |
| 3,151,783 | 10/1964 | Shaw et al. | 222—335 |

ROBERT B. REEVES, *Primary Examiner.*

HADD S. LANE, *Examiner.*